(12) United States Patent
Svec et al.

(10) Patent No.: US 9,187,644 B2
(45) Date of Patent: Nov. 17, 2015

(54) CONTINUOUS PROCESSING OF ASPHALT FORMULATIONS

(71) Applicants: James A. Svec, Kearny, NJ (US); Keith Edward Stephens, Waxahachie, TX (US); Denis Muki Tibah, Waxahachie, TX (US)

(72) Inventors: James A. Svec, Kearny, NJ (US); Keith Edward Stephens, Waxahachie, TX (US); Denis Muki Tibah, Waxahachie, TX (US)

(73) Assignee: Building Materials Investment Corporation, Wilmington, DE (US)

(*) Notice: Subject to any disclaimer, the term of this patent is extended or adjusted under 35 U.S.C. 154(b) by 18 days.

(21) Appl. No.: 14/143,074

(22) Filed: Dec. 30, 2013

(65) Prior Publication Data

US 2014/0275337 A1    Sep. 18, 2014

Related U.S. Application Data

(60) Provisional application No. 61/791,363, filed on Mar. 15, 2013.

(51) Int. Cl.
| | |
|---|---|
| C08J 3/22 | (2006.01) |
| C08L 95/00 | (2006.01) |
| E01C 19/00 | (2006.01) |
| C08L 91/00 | (2006.01) |
| C08J 3/00 | (2006.01) |

(52) U.S. Cl.
CPC ............. C08L 95/00 (2013.01); C08J 3/005 (2013.01); C08L 91/00 (2013.01); E01C 19/00 (2013.01); *C08J 2395/00* (2013.01); *C08J 2453/02* (2013.01); *C08L 2555/22* (2013.01); *C08L 2555/52* (2013.01); *C08L 2555/60* (2013.01); *C08L 2555/80* (2013.01)

(58) Field of Classification Search
CPC ......... C08L 51/00; C08L 55/02; C08L 91/00; C08L 95/00
USPC .................... 523/344, 351; 524/59, 68–71
See application file for complete search history.

(56) References Cited

U.S. PATENT DOCUMENTS

| | | | |
|---|---|---|---|
| 1,782,186 A | 11/1930 | Abson | |
| 2,179,208 A | 11/1939 | Burk et al. | |
| 2,200,914 A | 5/1940 | Burk et al. | |
| 2,233,259 A | 2/1941 | Harth | |
| 2,375,117 A | 5/1945 | Lentz | |
| 2,450,756 A | 10/1948 | Hoiberg | |
| 2,762,755 A | 9/1956 | Kinnaird, Jr. | |
| 3,126,329 A | 3/1964 | Fort | |
| 3,281,383 A | 10/1966 | Zelinski et al. | |
| 3,678,134 A * | 7/1972 | Middlebrook | 525/98 |
| 4,325,641 A | 4/1982 | Babus et al. | |
| 4,338,137 A | 7/1982 | Goodrich | |
| 4,584,023 A | 4/1986 | Goodrich | |
| 4,706,893 A | 11/1987 | Brock | |
| 4,837,252 A | 6/1989 | Seguin et al. | |
| 4,867,572 A | 9/1989 | Brock et al. | |
| 5,002,987 A | 3/1991 | Schulz | |
| 5,090,861 A | 2/1992 | Malcolm et al. | |
| 5,098,025 A | 3/1992 | Drouin et al. | |
| 5,102,487 A | 4/1992 | Lamb | |
| 5,201,472 A | 4/1993 | Brock | |
| 5,470,146 A | 11/1995 | Hawkins | |
| 5,626,659 A | 5/1997 | Chivers | |
| 5,973,037 A | 10/1999 | Fields | |
| 6,039,914 A | 3/2000 | Gehrke et al. | |
| 6,194,519 B1 | 2/2001 | Blalock et al. | |
| 6,497,930 B1 | 12/2002 | Petermeier | |
| 6,521,076 B1 | 2/2003 | Eliot | |
| 6,743,313 B2 | 6/2004 | Mischo | |
| 7,052,635 B2 | 5/2006 | Mischo | |
| 7,297,301 B1 | 11/2007 | Deschamps et al. | |
| 7,805,909 B2 | 10/2010 | Teng et al. | |
| 7,901,563 B2 | 3/2011 | Ruan et al. | |
| 7,913,940 B2 | 3/2011 | Harmon | |
| 8,192,539 B2 | 6/2012 | Barger et al. | |
| 2002/0066813 A1 | 6/2002 | Mischo | |
| 2002/0107312 A1* | 8/2002 | Lucchi et al. | 524/59 |
| 2002/0111401 A1* | 8/2002 | Izumoto | 524/59 |
| 2005/0051055 A1 | 3/2005 | Rivas et al. | |
| 2008/0041982 A1 | 2/2008 | Paulson et al. | |
| 2009/0133834 A1* | 5/2009 | Lechat et al. | 156/334 |
| 2011/0049275 A1 | 3/2011 | Zickell et al. | |
| 2012/0248231 A1 | 10/2012 | Fredsall | |
| 2013/0042793 A1 | 2/2013 | Peregrine et al. | |

OTHER PUBLICATIONS

U.S. Appl. No. 13/916,713, filed Jun. 13, 2013, Svec et al.

* cited by examiner

*Primary Examiner* — Edward Cain
(74) *Attorney, Agent, or Firm* — Alvin T. Rockhill (57) ABSTRACT

The subject invention provides a method for producing essentially homogeneous asphalt compositions which are comprised of the asphalt, a block copolymer (such as a linear block copolymer or a radial block copolymer), and one or more additional desired additives. This method offers the advantage of being capable of attaining the essentially homogeneous asphalt composition in one pass procedure with a short residence time in the mixing equipment. This greatly reduces the thermal history to which heat sensitive asphalt additives, such as asphalt modification polymers, are exposed. It also simplifies the mixing procedure and can reduce the overall amount of energy required to attain the desired blend. In some case, it allows for the production on a commercial basis of asphalt compositions which would otherwise not be feasible, for instance the production of asphalt compositions which contain high levels of asphalt modifications polymers which are otherwise difficult to process.

17 Claims, 3 Drawing Sheets

FIG-3

CONTINUOUS PROCESSING OF ASPHALT FORMULATIONS

This application claims benefit of U.S. Provisional Patent Application Ser. No. 61/791,363, filed on Mar. 15, 2013. The teachings of U.S. Provisional Patent Application Ser. No. 61/791,363 are incorporated herein by reference in their entirety.

FIELD OF THE INVENTION

The invention relates to asphalt formulations and more particularly to a method for preparing asphalt compositions in which the asphalt, additives and modifiers are mixed in a continuous process.

BACKGROUND OF THE INVENTION

Asphalt offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux, is essentially the residue that remains after gasoline, kerosene, diesel fuel, jet fuel, and other hydrocarbon fractions have been removed during the refining of crude oil. In other words, asphalt flux is the last cut from the crude oil refining process.

To meet performance standards and product specifications, asphalt flux that is recovered from refining operations is normally treated or processed to attain desired physical characteristics and to attain uniformity. For instance, asphalt that is employed in manufacturing roofing products typically needs to be treated to meet the special requirements demanded in roofing applications. More specifically, in the roofing industry it is important to prevent asphaltic materials from flowing under conditions of high temperature, such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

In any case, to attain the desired set of properties needed for a particular application the base asphalt is normally treated by the addition of various chemicals and/or polymer modifiers. For instance, in the case of asphalt which needs to be air blown to attain the required level of stiffness and increased softening point demanded in roofing applications the asphalt flux is typically treated by an air blowing process which is facilitated by air blowing catalysts. This is because in such air blowing techniques the time needed to attain the desired increase in softening point can be significantly reduced by mixing an air blowing catalyst into the asphalt flux prior to the air blowing procedure. In conventional air blowing methods air is pumped through the asphalt flux for a period of about 2 to about 8 hours while it is maintained at an elevated temperature which is typically within the range of 400° F. (204° C.) to 550° F. (288° C.). The air blowing process optimally results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate CuSO, zinc chloride $ZnCl_2$, phosphorous sesquesulfide, $P_4S_3$, phosphorous pentasulfide, $P_{2S5}$, and phytic acid, $C_6H_6O_6$ $(H_2PO_3)_6$ (see U.S. Pat. No. 4,584,023) have all been identified as being useful as air blowing catalysts. For example, U.S. Pat. No. 2,179,208 discloses a process for manufacturing asphalts which comprises the steps of air-blowing a petroleum residuum in the absence of any added catalysts while maintaining the temperature at about 149° C. to 260° C. (300° F. to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing with air can then be continued in the presence of the polymerizing catalyst.

U.S. Pat. No. 5,002,987 relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity of less than 50. The latex is a random polymer comprising from about 60 to 100 weight percent of at least one conjugated diolefin containing from 4 to 6 carbon atoms and from about 0 to 40 weight percent styrene. This latex polymer is highly compatible with the asphalt and provides good ductility which results in good resistance to low temperature cracking.

United States Publication 2005/0051055 discloses a method for preparing an asphalt composition, which method comprises the steps of providing an asphalt; mixing sulfur with said asphalt at a temperature greater than 200° C. to provide a sulfur-asphalt blend; providing a heavy aromatic oil; and mixing said heavy aromatic oil with said sulfur-asphalt blend to provide said asphalt composition. U.S. Pat. No. 5,973,037 discloses a method of preparing a non-plasticized styrene-ethylene-butylene-styrene (SEBS) modified asphalt emulsion for application at ambient temperatures in roofing, sealing, paving, waterproofing membranes, the method comprising the steps of: placing asphalt at 250° F. to 500° F. in a mixing vessel; adding at least 1% by weight styrene ethylene butylene styrene (SEBS) copolymer to said vessel; mixing said asphalt and copolymer at 250° F. (121° C.) to 500° F. (260° C.) whereby a styrene-ethylene-butylene-styrene (SEBS) modified asphaltic mixture results; and combining said asphaltic mixture with a water slurry to form an asphaltic emulsion suitable for application at ambient temperatures. U.S. Pat. No. 4,837,252 discloses a two stage process for preparing a polymer modified asphalt composition, said process consisting of: (A) a first stage comprising forming a low asphalt masterbatch by (i) providing a composition comprising 100 parts by weight of ethylene-propylene elastomer, having from 45 to 75 mole percent ethylene, 20 to 50 parts by weight of asphalt, 10 to 100 parts by weight of a thermoplastic polyolefin, 10 to 50 parts by weight napthenic oil and 8 to 20 parts by weight filler, (ii) mixing said composition in standard rubber mixing equipment at a temperature high enough to at least soften said thermoplastic polyolefin, and (iii) discharging said composition from said rubber mixer; and (B) a second stage comprising adding said masterbatch to heated asphalt in an asphalt mixer, and mixing said masterbatch with said heated asphalt, wherein said polymer modified composition contains from 2 to 25 weight percent of said masterbatch.

U.S. Pat. No. 5,470,146 discloses an apparatus for manufacturing an asphaltic composition, comprising: a single inclined cylindrical rotatable drum having an upper inlet end and a lower discharge end, and including means disposed about an inner wall of the drum for advancing aggregate materials for inclusion in the asphaltic composition to move in a generally longitudinal, downstream direction away from the upper inlet end and toward the lower discharge end in response to rotation of said drum, said means for advancing aggregate materials including first flighting means for creating a falling curtain of said aggregate materials in an upstream portion of the drum, second flighting means for mixing and stifling said aggregate materials disposed in a downstream portion of the drum adjacent to the lower discharge end, and third flighting means disposed downstream of said first flighting means and upstream of said second flighting means for confining said aggregate materials generally to the inner wall of the drum; means for rotating said drum; first housing means, disposed about and receiving the inlet end of the drum, for placing virgin aggregate material into said upper inlet end of said drum for movement in said downstream direction towards said lower discharge end, and for exhausting gases; a burner head for a combustion source of hot gases mounted within said drum intermediate said upper inlet and lower discharge ends and disposed upstream of said second flighting means and downstream of said third flighting means to divide said drum into a heating zone upstream from said burner head and a mixing zone downstream from said burner head, the burner head disposed for gas discharge toward the upper inlet end and for directing a stream of hot gases from said burner head in a counterflow direction with respect to the downstream movement of said virgin aggregate material in said heating zone to flow out of the drum through the first housing means, and away from said mixing zone, whereby said mixing zone will be free from the presence of said hot gas stream; means, extending into the drum to the burner head, for supplying fuel and forced combustion air to the burner head to maintain a burner flame longitudinally within the drum and within said heating zone having said third flighting means; second housing means, disposed at the lower discharge end of the drum and receiving the lower discharge end of the drum, and including discharge means for directing an asphaltic composition from the drum and for discharging said asphaltic composition through said discharge means; secondary air tube means, penetrating said second housing means and extending centrally into the drum to the burner head and receiving said fuel and forced combustion air supply means therein and forming with the drum an annulus, for establishing secondary, atmospheric air flow to said burner head within said air tube means through the drum from outside said drum and for isolating said secondary, atmospheric air flow from said mixing zone, the mixing zone occupying the annulus between said secondary air tube means and the drum; and means for introducing liquid asphalt material into said mixing zone. U.S. Pat. No. 4,867,572 discloses an apparatus for manufacturing asphalt paving composition, comprising: a drum having a longitudinal axis inclined with respect to horizontal such that said drum has an upper end and a lower end; a fixed sleeve having a semicylindrical lower portion concentric with said drum, said sleeve being disposed to receive an intermediate portion of said drum therewithin such that portions of said drum extend above and below said sleeve, said fixed sleeve having an upper end and a lower end, said drum and said semicylindrical lower portion of said fixed sleeve defining a semiannular space therebetween; means longitudinally space apart from said fixed sleeve for supporting said portions of said drum which extend above and below said sleeve such that said drum is supported for rotation about said longitudinal axis; means for heating the interior of said drum; means for introducing aggregate into the upper end of said drum for heating and drying; means for discharging the heated and dried aggregate from said drum into said semiannular space between said drum and said fixed sleeve at the lower end of said sleeve; means operatively associated with said drum for mixing a material in said semiannular space between said drum and said fixed sleeve and for moving a material in said semiannular space toward the upper end of said fixed sleeve; means for introducing liquid asphalt into said fixed sleeve along with said aggregate for mixing therewith, whereby said liquid asphalt is mixed with said aggregate, and whereby the mixture of aggregate and liquid asphalt is moved toward the upper end of said fixed sleeve; and means for discharging said mixture of aggregate and liquid asphalt from said fixed sleeve for use as an asphalt paving composition.

Asphalt formulations used in industrial applications and as a paving material are generally processed in batch operations which require the asphalt formulations to be processed at elevated temperatures for a lengthy period of time. Such discontinuous operations employ expensive mixing equipment which consumes high levels of energy. Additionally, on some occasions it is not commercially feasible to prepare asphalt compositions which are modified with relatively high levels (greater then 20 percent or 25 percent) of certain asphalt modifications polymers which are difficult to process.

SUMMARY OF THE INVENTION

The subject invention provides a method for producing essentially homogeneous asphalt compositions which are comprised of the asphalt, a block copolymer (such as a linear block copolymer or a radial block copolymer), and one or more additional desired additives. By utilizing the technique of this invention asphalts and styreneic block copolymers having a linear, radial, branched, star or another type or macrostructure, such as SEBS, SBS, and the like, can be mixed to make polymer modified asphalts. In any case, the technique of this invention can also be utilized in mixing polymers with plasticizers, asphalts with wax, asphalts with styrenic block copolymers and wax, and asphalt with polyolefins, such as polyethylene and polypropylene. Asphalt compositions which contain high levels of polymers (polymer concentrates) can also be made utilizing the technique of this invention. Such concentrates can then be mixed into other asphalt compositions utilizing conventional mixing devices and systems. The mixing and blending of various asphalt types which may include various permutations and/or combinations of PG asphalts, asphalt flux, blown asphalt, propane distilled asphalts (PDA), vacuum tower bottoms, hard PEN asphalts, and the like, is also within the scope of this invention. In any case, making polymer modified asphalts (not a concentrate) that are ready for use in various applications, such as roofing, adhesives, sealants, paving, and the like is also within the scope of this invention.

This method offers the advantage of being capable of attaining the essentially homogeneous asphalt composition in one pass procedure with a short residence time in the mixing equipment. This greatly reduces the thermal history to which heat sensitive asphalt additives, such as asphalt modification polymers, are exposed. It also simplifies the mixing procedure and can reduce the overall amount of energy required to attain the desired blend. In some case, it allows for the production on a commercial basis of asphalt compositions which would otherwise not be feasible, for instance the production of asphalt compositions which contain high levels of asphalt modifications polymers which are otherwise difficult to process. In any case, the asphalt compositions made by the process of this invention can be utilized in manufacturing roofing shingles that are of improved consistency and which offer better durability aging (less prone to oxidative degradation).

The present invention more specifically discloses a method for preparing an asphalt formulation in a continuous processor which comprises continuously feeding a base asphalt, a block copolymer, and optionally one or more additional ingredients, into a continuous processor having at least two co-rotating shafts, at least one feed zone, a driving zone, a mixing zone, and a discharge zone, wherein the asphalt is maintained in the continuous processor for a maximum residence time of about 15 minutes at a temperature which is above the melting point or the softening point of the asphalt, such as a temperature which is within the range of about 250° F. to about 400° F., and discharged from the discharge zone of the continuous processor as the asphalt formulation. The asphalt will typically be maintained in the continuous processor for a maximum period of 10 minutes or less, such as a period of 1 minutes to 8 minutes or 2 minutes to 5 minutes.

DETAILED DESCRIPTION OF THE INVENTION

In practicing the subject invention asphalt formulations are made in a continuous processor wherein an asphalt base, a block copolymer (such as a linear block copolymer or a radial block copolymer), and optionally one or more additional ingredients are continuously mixed. The continuous processor 1 utilized in the practice of this invention is comprised of at least two shafts 2, 3 which co-rotate to mix, process and extrude the formulation on a continuous basis. The co-rotating shafts 2, 3 are housed within a housing 4 with a tight tolerance to the outermost features 26 of the co-rotating shafts 2, 3. The continuous processor includes at least one heating vessel 10, 11, 12 which heats the asphalt to an elevated temperature at which it is capable of being pumped through the continuous processor 1 while being mixed. The asphalt will normally be heated to a temperature above its softening point and will typically be heated to a temperature which is above its melting point. More specifically, the bitumen component is heated until the bitumen component of the composition is in the molten state. As used herein, the phrase "molten state" refers to the point at which the bitumen component becomes liquid. Those skilled in the art will recognize that most bitumens reach a "molten state" within the temperature range of from about 87° C. to about 121° C., more specifically from about 93° C. to about 105° C.

Figure 2:
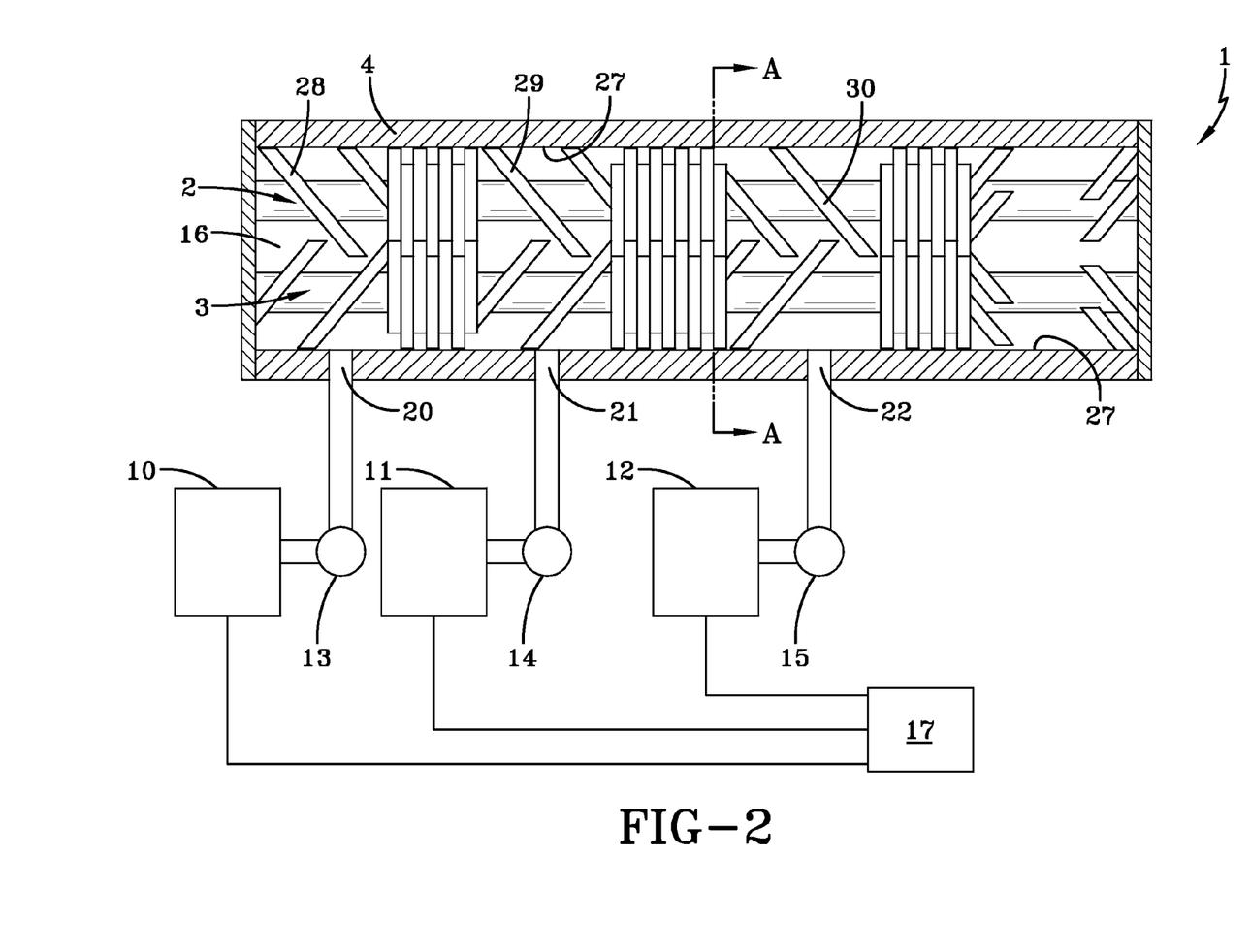
FIG. 2 is a schematic cross-sectional view of a continuous processor which can be utilized in the practice of this invention which includes heating vessels and pumps for feeding asphalt base into the continuous processor.

The continuous processor also includes at least one pump 13, 14, 15 for pumping the asphalt into a processing chamber 16 of the continuous processor 1. The heating vessels 10, 11, 12 and pumps 13, 14, 15 can be controlled by a computer 17 to ensure that the desired amount of asphalt is added to continuous processor 1. The first heating vessel 10 and first pump 13 will be connected to the processing chamber 16 through a feed end asphalt port 20. If more than one heating vessel 10, 11, 12 and pump 13, 14, 15 is used, each additional heating vessel 11, 12 and pump 14, 15 may be attached to the continuous processor 1 through different asphalt ports 21, 22 along the continuous processor 1 to feed the asphalt into the processing chamber 16 so that more asphalt may be added to the asphalt formulation at different stages of processing.

The continuous processor 1 has the ability to process asphalt and asphalt additives which are of relatively high viscosities at moderate temperatures. The asphalt formulation will normally be processed at a temperature of about 200° F. (93° C.) or above, and will preferably be processed at a temperature which is within the range of 250° F. (121° C.) to 420° F.). (216°. For instance, the asphalt can be processed at a temperature which is between 250° F. (121° C.) and 400° F. (204° C.). The asphalt formulation will typically be processed between 275° F. (135° C.) and 375° F. (191° C.). The asphalt formulation will more typically be processed between 300° F. (149° C.) and 350° F. (177° C.), such as at about 325° F. (163° C.).

Figure 1:
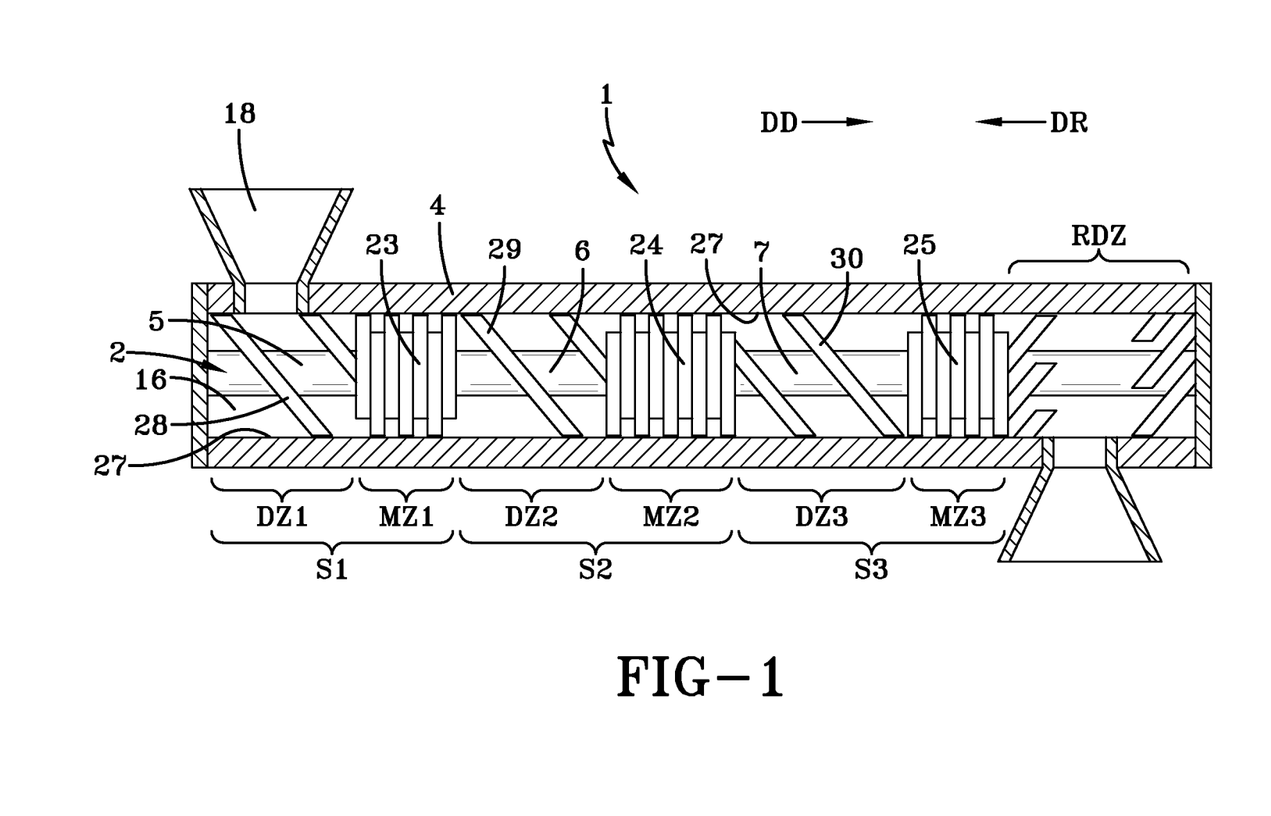
FIG. 1 is a schematic cross-sectional view of a continuous processor which can be utilized in the practice of this invention.

Asphalt can be added in stages S1, S2, S3, which allows for a homogeneous mixing without degradation of temperature sensitive additives. Each of the co-rotating shafts include at least one driving zone DZ1, DZ2, DZ3 which provides a thrust to the asphalt formulation in a drive direction DD parallel to the shafts starting at the feed end and exiting at a discharge end. Preferably, each driving zone DZ1, DZ2, DZ3 consists of a screw arrangement 5, 6, 7 having flights 28, 29, 30 which drive the asphalt formulation from the inlet to a mixing zone.

Figure 3:
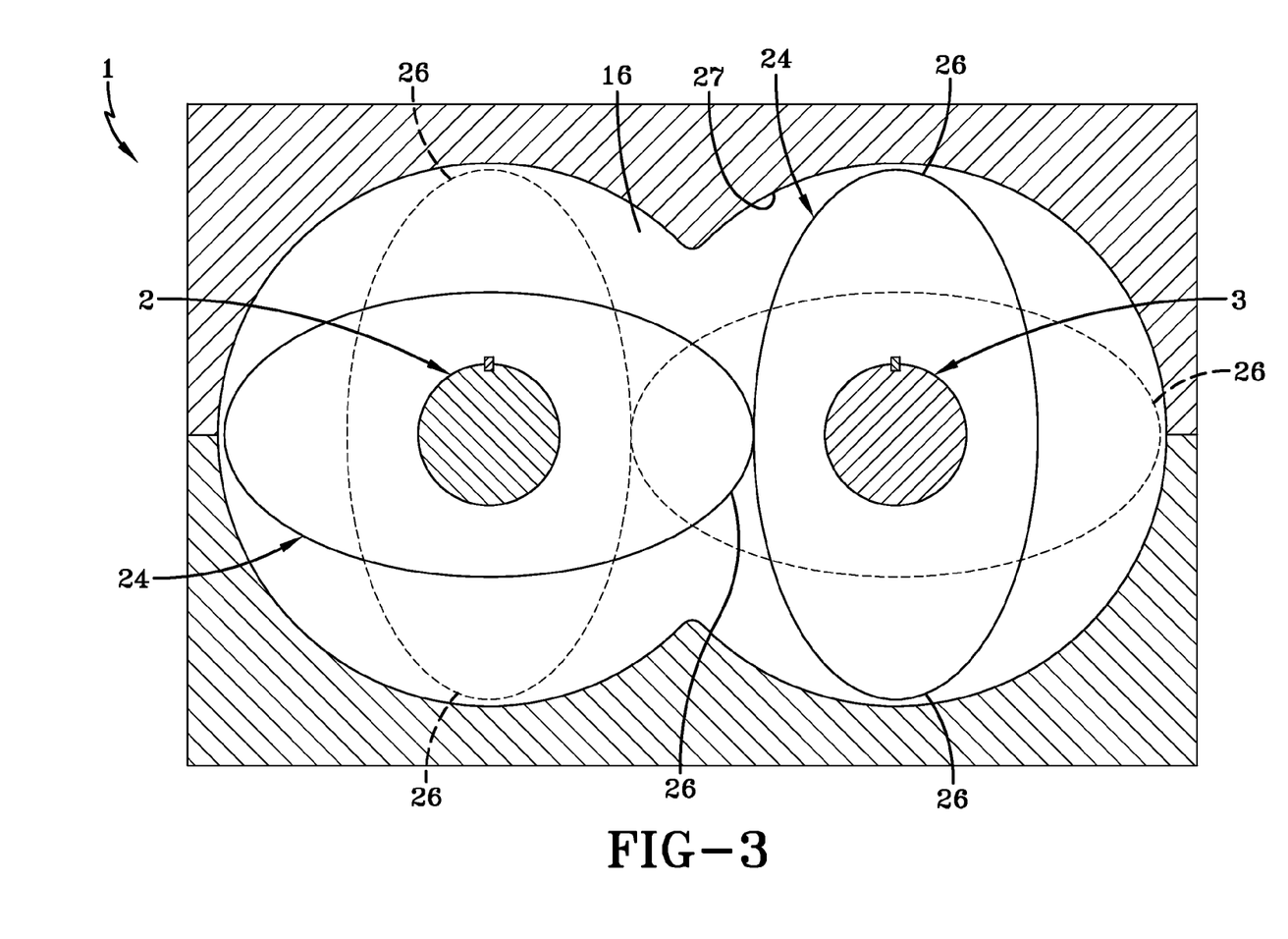
FIG. 3 is a schematic cross-sectional view illustrating self-cleaning paddles which can be employed in the mixing zone of the continuous processor utilized in the practice of this invention.

Each of the co-rotating shafts 2, 3 also includes paddles 23, 24, 25 which are arranged to intermesh with paddles of at least one other shaft to form the mixing zones MZ1, MZ2, MZ3. Preferably, the mixing zones MZ1, MZ2, MZ3 provide little to no thrust to the asphalt formulation in the drive direction DD or in the opposing direction DR. The minimal thrust in the mixing zones MZ1, MZ2, MZ3 imparts on the asphalt formulation high shear forces which improves mixing and increases the residence time of the asphalt formulation in that particular mixing zone. The paddles 23, 24, 25 in the mixing zones MZ1, MZ2, MZ3 are preferably designed to provide a great amount of shear in the asphalt formulation both between the paddles directly across from each other on opposing shafts and between paddles which are one space removed from each other along the shafts on opposing shafts. The two co-rotating shafts 2, 3 and close clearances between the paddles 23, 24, 25 on each shaft and between the paddles 23, 24, 25 and the processing chamber walls (barrel) 27 provide efficient uniform mixing in less time than conventional mixers. The screw flights 28, 29, 30 and paddles 23, 24, 25 comprise the outermost features 26 of the co-rotating shafts 2, 3. The paddles in the mixing zones MZ1, MZ2, MZ3 are typically designed so as to provide a self-cleaning effect with respect to the paddles and the barrel 27 of the continuous processor. Each section of driving zone DZ1, DZ2, DZ3 and mixing zone MZ1, MZ2, MZ3 constitute one stage S1, S2, S3. Each stage S1, S2, S3 should result in a nearly uniform homogeneous mixture of the contents added up to that stage.

A conventional mixer typically takes at least two hours to thoroughly mix a batch of asphalt formulation. A conventional mixer and can take up to four hours or more to thoroughly mix a batch of asphalt formulation. This extended amount of time required for processing can lead to degradation of the asphalt, polymer modifiers, and other chemical additives due to exposure to heat throughout the processing. The continuous processing of the asphalt formulation requires the asphalt, polymer modifiers, and other chemical additives to be exposed to heat for only a fraction of that time thereby reducing or eliminating degradation of the polymer additives because there is less thermal history. The continuous processor 1 can typically process asphalt formulations in an amount of time between about 1 to about 20 minutes. The continuous processor 1 will preferably process asphalt formulations in an amount of time between about 2 to about 15 minutes. The continuous processor 1 will more preferably process asphalt formulations in an amount of time between about 3 to about 8 minutes.

The two co-rotating shafts 2, 3 can have a plurality of driving zones DZ1, DZ2, DZ3 separated by mixing zones MZ1, MZ2, MZ3. The two co-rotating shafts 2, 3 can also have one type of mixing zone adjacent to another type of mixing zone. It is preferable to have a reverse driving zone RDZ at the end of the two co-rotating shafts 2, 3 at or beyond the discharge location 19 which imparts a thrust on the asphalt formulation in a direction parallel to the shafts and away from the discharge end toward the feed end (in the direction DR as shown in FIG. 1). This reverse driving zone RDZ forces the formulation away from the end wall of the processing chamber and creates pressure in the asphalt formulation which aids in removal of the asphalt formulation through the discharge location 19.

Along with asphalt, other additives such as limestone, oils, and polymers can be added to the asphalt formulation. The addition of the additives may be at the feed end 18 of the mixing chamber 6 or at other optional additive locations. The additive locations are preferably located to coincide with one of the driving zones DZ1, DZ2, DZ3. In any case, the asphalt base, the block copolymer, and any other asphalt additives are mixed in the continuous processor to attain an essentially homogeneous blend. Bitumen additives are generally considered to be homogeneous within a blend if they completely disperse in the bitumen on an equal or finer scale than the film of bitumen on aggregate. On the other hand, it is well known that SBS polymers dispersed in bitumen to form a phase structure comprising a polymer rich phase and a bitumen rich phase. It is generally accepted that the scale of this phase structure is on the order of less than approximately ten microns. Accordingly, as used herein with regard to the present invention, the phrase "homogeneous blend" refers to a mixture that comprises the bitumen component and block copolymer composition such that the block copolymer composition is dispersed within the bitumen component on the approximate ten micron scale or less.

The method of this invention for continuously preparing asphalt formulations can be use for mixing a block copolymer, and optionally one or more additional ingredients, into virtually any type of asphalt base. Examples of suitable asphalt flux which can be utilized in the process of this invention includes, but is not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to, mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 25 dmm (1 dmm=0.1 mm) to about 400 dmm at 25° C.; therefore quite hard bitumens of a penetration of from about 60 dmm to about 70 dmm may be used, but generally a straight run or distilled bitumen having a penetration from about 110 dmm to about 250 dmm will be the most convenient to use. Both compatible as well as incompatible bitumens may be used.

Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by ASTM as a class of black or dark colored (solid, semi-solid or viscous) cementitious substances, natural or manufactured, composed principally of high molecular weight hydrocarbons, of which asphalts, tars, pitches, asphaltites are typical. The ASTM definition further classifies asphalts or bituminous materials as solids, semi-solids, or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter), and a penetration at 25° C. under a load of 50 grams applied for 1 second of not more than 35 millimeters. Semi-solid and liquid asphalts are predominate in commercial applications today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the midpoint of the viscosity range. Petroleum asphalts are the most common source of asphalt cements. Petroleum asphalts are produced from the refining of petroleum and are used predominantly in both paving and roofing applications. Petroleum asphalts, compared to native asphalts, are organic with only trace amounts of inorganic materials.

The method of this invention is primarily applicable to the preparation of industrial asphalt which is used in roofing and other industrial products. Asphalt is used in manufacturing roofing shingles because it has the ability to bind sand, aggregate, and fillers to the roofing shingle while simultaneously providing excellent water barrier characteristics. To meet performance standards and product specifications for utilization in roofing applications the asphalt flux that is recovered from refining operations is normally treated or processed to attain desired physical characteristics and to attain uniformity. For instance, the asphalt that is employed in manufacturing roofing products normally has to be treated to meet the special requirements demanded in roofing applications. More specifically, in the roofing industry it is important to prevent asphaltic materials from flowing under conditions of high temperature such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

To attain the required level of stiffness and increased softening point that is demanded in roofing applications the asphalt flux is typically treated by an air blowing process. In such air blowing techniques, air is blown through the asphalt flux for a period of about 2 to about 8 hours while it is maintained at an elevated temperature which is typically within the range of about 400° F. (204° C.) to 550° F. (288° C.). The air blowing process results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a polymerization catalyst is added for an additional treatment period of 20 to 300 minutes at a temperature of 225° F. (107° C.) to 450° F. (232° C.). Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate $CuSO$, zinc chloride $ZnCl_2$, phosphorous sesquesulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $H_mR_nPO_4$.

All of the air blowing techniques described in the prior art share the common characteristic of both increasing the softening point and decreasing the penetration value of the asphalt flux treated. In other words, as the asphalt flux is air blown, its softening point increases and its penetration value decreases over the duration of the air blowing procedure. It has been the conventional practice to air blow asphalt flux for a period of time that is sufficient to attain the desired softening point and penetration value. However, in the case of some asphalt fluxes, air blowing to the desired softening point using conventional procedures results in a penetration value which is too low to be suitable for utilization in roofing applications. These asphalt fluxes are called "hard asphalt fluxes". In other words, hard asphalt fluxes cannot be air blown using conventional procedures to a point where both the required softening point and penetration values are attained. However, U.S. Pat. No. 7,901,563 discloses a technique that can be used to air blow hard asphalt flux to both a softening point which is within the ranged of 185° F. (85° C.) to 250° F. (121° C.) and a penetration value at 77 F.° (25° C.) of above 15 dmm. More specifically, U.S. Pat. No. 7,901,563 describes a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm at 77° F. (25° C.) to produce the industrial asphalt.

The block copolymer mixed into the asphalt base is comprised of blocks of a conjugated diolefin monomer and blocks of a vinyl aromatic monomer. The block copolymer can be a linear block copolymer or a radial block copolymer, such as a styrene/ethylene-butylene/styrene block copolymer. U.S. Pat. No. 5,090,861 provides a description of various radial block copolymers that can be used in the practice of this invention. The teachings of U.S. Pat. No. 5,090,861 are incorporated herein for the purpose describing radial block copolymers that can be employed in the process of this invention.

The radial block copolymer employed in the practice of this invention is typically of the structural formula: $(A-B)_x$—Y—$(B)_y$, wherein x represents an integer of at least 3, wherein y represents an integer which is within the range of 0 to 10, wherein A represents a glass block of a vinyl aromatic monomer, wherein B represents a block of a rubbery polymer, and wherein Y represents the residue of a polyfunctional coupling agent. The block of the rubbery polymer will typically be comprised of repeat unites of a conjugated diolefin monomer containing from 4 to about 12 carbon atoms. Such conjugated diolefin monomers will more typically contain from 4 to about 8 carbon atoms and will most typically contain from 4 to 6 carbon atoms. In most cases x will represent an integer from 3 to 8 with x most commonly representing an integer from 3 to 5. In most cases y will represent an integer from 0 to 6 and will most commonly represent an integer from 0 to 4.

The glass block will typically be comprised of repeat units which are derived from a vinyl aromatic monomer. It should be noted that the A block and the B block can be homopolymer blocks or copolymers blocks of related monomers. It should also be appreciated that at the transition between the blocks some random copolymerization of monomers of the A block and monomers of the B block can exist. In most cases Y will be the residue of a polyfunctional coupling agent selected from the group consisting of polyepoxides, polyimines, polyisocyanates, polyaldehydes, and polyhalides.

In many cases the radial block copolymer will be of the structural formula:

wherein A represents a block of a vinyl aromatic monomer, wherein B represents a block of a rubbery polymer, wherein Y represents the residue of a polyfunctional coupling agent, and wherein n represents an integer which is within the range of 1 to 3. In other words, n can represent the integer 1, 2, or 3. Some representative examples of vinyl aromatic monomers that can be included in radial block copolymers of this type include styrene, α-methyl styrene, 3,5-diethyl styrene, 4-n-propyl styrene, 4-cyclohexyl styrene, 4-phenyl styrene, 4-methoxy styrene, 3-pentoxystyrene, 2,4,6-trimethyl styrene, 4-decyl styrene, 1-vinyl naphthalene, 2-vinyl naphthalene, 8-phenyl-1-vinyl naphthalene, 3-benzyl styrene, vinyl toluene, tertiary-butyl styrene, 4-chloro styrene, and the like.

The B block will normally be comprised of repeat units which are derived from a conjugated diolefin monomer. Some representative examples of conjugated diolefin monomers that can be employed in such radial block copolymers include 1,3-butadiene, isoprene, 1,3-pentadiene, 1,3-hexadiene, 1,3-heptadiene, 2,3-dimethyl-1,3-butadiene, 2-ethyl-1,3-pentadiene, 2-methyl-1,3-hexadiene, 1,3-octadiene, 3-butyl-1,3-octadiene, 2-methyl-1,3-undecadiene, 2-methyl-3-isopropyl-1,3-butadiene, and the like. The conjugated diolefin monomer will typically be selected from 1,3-butadiene and isoprene. Such radial block copolymers preferably contain 15 weight percent to 45 weight percent of a vinyl aromatic monomers and most preferably contain 25 weight percent to 35 weight percent vinyl aromatic monomers. A preferred radial block copolymer of this type has an A block which is comprised of styrene and a B block which is comprised of butadiene, isoprene, or mixtures thereof which can be hydrogenated. The weight average molecular weight of the radial block copolymer is typically at least about 140,000. Preferably the weight average molecular weight of the block copolymer will be at least about 160,000. In many cases the weight average molecular weight of the radial block copolymer will be within the range of 170,000 to 275,000. The weight average molecular weight of the radial block copolymer will commonly be within the range of 200,000 to 250,000.

As used herein with regard to the radial block copolymers used in the practice of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

In this type of radial block copolymer Y will typically represent the residue of a polyfunctional coupling agent, such as the residue of a polyepoxide, a polyimine, a polyisocyanate, a polyaldehyde, or a polyhalide. Some representative examples of polyepoxides which can be utilized as the polyfunctional coupling agent include epoxidized liquid polybutadiene. epoxidized liquid polyisoprene, epoxidized vegetable oil, epoxidized soybean oil, epoxidized linseed oil, epoxidized castor, 1,2,5,6,9,10-triepoxydecane, and the like.

The polyisocyanates that can be employed as the polyfunctional coupling agent are preferably compounds of the formula $R(NCO)_m$ wherein R represents a polyvalent organic radical which can be aliphatic, cycloaliphatic, or aromatic and which contains from 2 to about 30 carbon atoms. In this formula m represents an integer of at least 3 with m preferably being 3 or 4. Some representative examples of such polyisocyanates include benzene-1,2,4-triisocyanate, naphthalene-1,2,5,7-tetraisocyanate, triphenylmethane-triisocyanate, naphthalene-1,3,7-triisocyanate, and the like. A particularly preferred polyisocyanate which can be used as the polyfunctional coupling agent is polyarylpolyisocyanate (PAPI-1) which has an average of 3 isocyanate groups per molecule and has an average molecular weight of about 380. Structurally PAPI-1 can be represented by a series of isocyanate-substituted benzene rings joined through methylene linkages.

The polyimines that can be used as the polyfunctional coupling agent are also known as polyaziridinyl compounds and preferably contain 3 or more aziridine rings of the formula:

wherein the R groups can be the same or different and represent hydrogen atoms, alkyl groups, aryl groups, or cycloalkyl groups which contain from 1 to about 20 carbon atoms. The aziridine rings can be attached to a carbon atom, a phosphorous atom, or a sulfur atom. Some representative examples of these compounds include triaziridinyl phosphene oxides and triaziridinyl phosphene sulfides, such as tri(1-aziridinyl) phosphine oxide, tri(2-methyl-1-aziridinyl) phosphine oxide, tri(2-ethyl-3-decyl-1-aziridinyl) phosphine sulfide, tri(2-phenyl-1-aziridinyl) phosphine oxide, tri(2-methyl-3-cyclohexyl-1-aziridinyl) phosphine oxide, and the like. Triaziridinyl substituted triazines and triphosphatriazines containing 3, 4, 5, or 6 aziridinyl substituted rings can also be utilized as the polyfunctional coupling agent in the radial block copolymers employed in the practice of this invention. Some representative examples of such compounds include 2,4,6-tri(aziridinyl) 1,3,5-triazine, 2,4,6-tri(2-methyl-1-aziridinyl)1,3,5-triazine, 2,4,6-tri(1-aziridimyl)-2,4,6-triphospha-1,3,5-triazine, 2,4,6-tri(2-methyl-n-butylaziridinyl)2,4,6-triphospha-1,3,5-triazine, and the like.

Some representative examples of polyaldehydes that can be used as the polyfunctional coupling agent include 1,4,7-naphthalene tricarboxyaldehyde, 1,7,9-anthracene tricarboxyaldehyde, 1,1,5-pentane tricarboxyaldehyde, and similar olyaldehyde-containing aliphatic and aromatic compounds. Some representative examples of polyketones that can be used as the polyfunctional coupling agent include 1,6-hexanedial-3-one, 1,4,9,10-anthracene-tetrone, 2,3-diacetonylcyclohexanone, and the like. Some representative examples of polyanhydrides that can be used as the polyfunctional coupling agent include pyromellitic dianhydride, styrene-maleic anhydride copolymer, and the like. Some representative examples of polyesters that can be used as the polyfunctional coupling agent include glycerol tristearates, glycerol trioleates, and similar compounds.

The polyhalides that can be employed as the polyfunctional coupling agent are normally polyhalogenated silicon compounds, polyhalogenated tin compounds, or polyhalogen substituted hydrocarbons. The polyhalogenated silicon compounds which can be used are typically of the structural formula:

wherein X represents a halogen atom and R represents a halogen atom, an alkyl group containing from 1 to about 8 carbon atoms, or an aryl group containing from 6 to about 10 carbon atoms. In most cases that halogen atom will be selected from fluorine, chlorine, bromine, and iodine with chlorine typically being preferred. In cases where R represents an alkyl group it will normally be a methyl group or an ethyl group. In any case, some representative examples of polyhalogenated silicon compounds that can be used include silicon tetrachloride, silicon tetrabromide, silicon tetraiodide, triflorosilane, trichlorosilane, tribromosilane, trichloroethylsilane, tribromoethylsilane, tribromobenzylsilane, trichlorobenzylsilane, and the like. Polyhalogenated substituted hydrocarbons such as 1,3,5-tri(bromomethyl)benzene or 2,5,6,9-tetrachloro-3,7-decadiene in which the halogen is attached to a carbon atom which is alpha to an activating group, such as an ether linkage, a carbonyl group, or a carbon-to-carbon double bond, can also be used. Substituents which are inert with respect to lithium atoms in the terminally reactive polymer can also be present in the active halogen containing compounds. Alternatively, other suitable reactive groups different from the halogen as described above can be present. Some representative examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

The polyhalogenated tin compounds which can be used as the polyfunctional coupling agent are frequently of the formula:

wherein X represents a halogen atom and R represents a halogen atom, an alkyl group containing from 1 to about 8 carbon atoms, or an aryl group containing from 6 to about 10 carbon atoms. In most cases that halogen atom will be selected from fluorine, chlorine, bromine, and iodine with chlorine typically being preferred. In cases where R represents an alkyl group it will normally be a methyl group or an ethyl group. Some representative examples of polyhalogenated tin compounds that can be used include tin tetrafluoride (also know as stannic fluoride), tin tetrachloride (also known as stannic chloride), tin tetrabromide (also known as stannic bromide), tin tetraiodide (also known as stannic iodide), methyl trichlorotin, methyl tribromotin, methyl trifluorotin, methyl triiodotin, dodecyltrichlorotin, dodecyltribromotin, dodecyltrifluorotin, dodecyltriiodotin, benzyltrichlorotin, benzyltribromotin, benzyltrifluorotin, benzyltriiodotin, 4-tolyltrifluorotin, 4-tolyltribromotin, 4-tolyltrichlorotin, 4-tolyltriiodotin, and the like.

The polyfunctional coupling agents which can be used encompass a vast array of suitable compounds which are further described in U.S. Pat. No. 3,281,383. The teachings of U.S. Pat. No. 3,281,383 are incorporated herein for the purpose of describing additional polyfunctional coupling agents that can be utilized in the synthesis of the radial block copolymer. In any case, it should be appreciated that these compounds are liquids and/or have relatively low molecular weights of less than about 2,000. They are also relatively free of other reactive groups which would compete with the groups named above for reaction with lithium-carbon bonds.

The block copolymer will be fed into the continuous processor at a level which is within the range of about 5 weight percent to about 45 weight percent, based upon the total weight of the asphalt formulation. In most cases the block copolymer will fed into the continuous processor at a level which is within the range of about 10 weight percent to about 40 weight percent, based upon the total weight of the asphalt formulation. The block copolymer is typically fed into the continuous processor at a level which is within the range of about 15 weight percent to about 35 weight percent, based upon the total weight of the asphalt formulation. For instance, the block copolymer can be fed into the continuous processor at a level which is within the range of about 20 weight percent to about 30 weight percent, based upon the total weight of the asphalt formulation.

In addition to the radial block copolymer numerous additional additives can also blended into the asphalt flux utilizing continuously utilizing the process of this invention. These agents include, but are not limited to, resins, oils, stabilizers, anti-statics, fillers (such as talc, calcium carbonate and carbon black), polyphosphoric acid, ground tire rubber, flame retardants, polyolefins, and asphalt modification polymers. The polyolefins that can be used include low density polyethylene, linear low density polyethylene, high density polyethylene, oxidized polyethylene, polypropylene, and the like. The amount of such optional ingredients added can range from 0 to about 20% by weight, based on the total weight of the bituminous binder composition. When antioxidants are added, they are typically present in an amount from about 0.1% by weight to about 5% by weight, based on the total weight of the bituminous binder composition.

While the present invention is particularly suited for making hot mix bitumen concrete, the products of the present invention will also be useful in other typical SBS polymer modified bitumen paving applications, such as hot chip seals, cut backs and emulsions. It is also envisioned that the present invention is suitable for non-paving applications such as modified bitumen roll roofing, self-adhesion waterproofing membranes, sound deadening and vibration damping compounds.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

An asphalt formulation (WW) was comprised of about 15% limestone, about 8% D-1184 polymer, about 74% asphalt, and about 3% kendex oil. The limestone, D-1184 polymer and kendex oil were added into a first feed location of a Readco Kurimoto continuous processor. About 13% of the asphalt was also added into the first feed location of the continuous processor. About 37% of the asphalt was added into a second feed location of the continuous processor. About 50% of the asphalt was added into a third feed location of the continuous processor. The WW formulation was processed at a rate of about 142 pounds/hour. The processing rate requires the polymer additive to be in the continuous processor for only about five minutes.

Example 2

An asphalt formulation (FR) was comprised of about 40% colemite/ATH blend, about 8% D-1184 polymer, about 52% asphalt. The colemite/ATH blend and D-1184 polymer were added into a first feed location of a Readco Kurimoto continuous processor. About 12% of the asphalt was also added into the first feed location of the continuous processor. About 43% of the asphalt was added into a second feed location of the continuous processor. About 45% of the asphalt was added into a third feed location of the continuous processor. The FR formulation was processed at a rate of about 244 pounds/hour. The processing rate requires the polymer additive to be in the continuous processor for less than three minutes.

Example 3

An asphalt formulation (WWT) was comprised of about 56% limestone, about 4% D-1184 polymer, about 40% asphalt. The limestone and D-1184 polymer were added into a first feed location of a Readco Kurimoto continuous processor. About 9% of the asphalt was also added into the first feed location of the continuous processor. About 18% of the asphalt was added into a second feed location of the continuous processor. About 73% of the asphalt was added into a third feed location of the continuous processor. The Formulation WWT was processed at a rate of about 270 pounds/hour. The processing rate requires the polymer additive to be in the continuous processor for less than three minutes.

While certain representative embodiments and details have been shown for the purpose of illustrating the subject invention, it will be apparent to those skilled in this art that various changes and modifications can be made therein without departing from the scope of the subject invention.

U.S. Provisional Patent Application Ser. No. 61/787,370 discloses a technique for preparing asphalt formulations which is similar to the technique disclosed and claimed in this patent application, and the teachings of U.S. Provisional Patent Application Ser. No. 61/787,370 are hereby incorporated by reference into this patent application in their entirety.

What is claimed is:

1. A method for preparing an asphalt formulation in a continuous processor which comprises continuously feeding a base asphalt, a polymer, and optionally one or more additional ingredients, into a continuous processor having at least two co-rotating shafts, at least one feed zone, a driving zone, a mixing zone, and a discharge zone, wherein the driving zone provides thrust to convey the asphalt in a drive direction from the feed zone toward the discharge zone of the continuous processor, wherein the mixing zone provides little or no thrust to the asphalt in the drive direction, wherein the mixing zone provides shear forces to mix the polymer and any additional ingredients throughout the base asphalt to produce the asphalt formulation which has an essentially homogeneous composition, wherein the asphalt is maintained in the continuous processor for a maximum residence time of about 20 minutes at a temperature which is above the softening point of the asphalt and which is above 200° F., and wherein the asphalt is discharged from the discharge zone of the continuous processor as the asphalt formulation.

2. The method of claim 1 wherein the shear forces are provided in the mixing zone by paddles which are affixed to the co-rotating shafts.

3. The method of claim 2 wherein the paddles provide a self-cleaning effect.

4. The method of claim 1 wherein the polymer is a block copolymer which is comprised of blocks of a conjugated diolefin monomer and blocks of a vinyl aromatic monomer.

5. The method of claim 4 wherein the block copolymer is a radial block copolymer of the structural formula: $(A-B)_x$—$Y$—$(B)_y$, wherein x represents an integer of at least 3, wherein y represents an integer which is within the range of 0 to 10, wherein A represents a glass block of a vinyl aromatic monomer, wherein B represents a block of a rubbery polymer, and wherein Y represents the residue of a polyfunctional coupling agent.

6. The method of claim 4 wherein the block copolymer is a radial block copolymer is of the structural formula:

wherein A represents a block of a vinyl aromatic monomer, wherein B represents a block of a rubbery polymer, wherein Y represents the residue of a polyfunctional coupling agent, and wherein n represents an integer which is within the range of 0 to 3.

7. The method of claim 6 wherein the vinyl aromatic monomer is selected from the group consisting of styrene, α-methyl styrene, 3,5-diethyl styrene, 4-n-propyl styrene, 4-cyclohexyl styrene, 4-phenyl styrene, 4-methoxy styrene, 3-pentoxystyrene, 2,4,6-trimethyl styrene, 4-decyl styrene, 1-vinyl naphthalene, 2-vinyl naphthalene, 8-phenyl-1-vinyl naphthalene, 3-benzyl styrene, vinyl toluene, tertiary-butyl styrene, and 4-chloro styrene.

8. The method of claim 6 wherein the block of the rubbery polymer is comprised of repeat units of a monomer selected from the group consisting of 1,3-butadiene, isoprene, 1,3-pentadiene, 1,3-hexadiene, 1,3-heptadiene, 2,3-dimethyl-1,3-butadiene, 2-ethyl-1,3-pentadiene, 2-methyl-1,3-hexadiene, 1,3-octadiene, 3-butyl-1,3-octadiene, 2-methyl-1,3-undecadiene, and 2-methyl-3-isopropyl-1,3-butadiene.

9. The method of claim 6 wherein the block of the rubbery polymer is comprised of repeat units of a monomer selected from the group consisting of 1,3-butadiene and isoprene.

10. The method of claim 6 wherein the residue of a polyfunctional coupling agent is the residue of a polyfunctional coupling agent selected from the group consisting of polyepoxides, polyimines, polyisocyanates, polyaldehydes, and polyhalides.

11. The method of claim 10 wherein the polyfunctional coupling agent is a polyepoxide.

12. The method of claim 11 wherein the polyepoxide is epoxidized liquid polybutadiene or epoxidized liquid polyisoprene.

13. The method of claim 11 wherein the polyepoxide is an epoxidized vegetable oil.

14. The method of claim 13 wherein the epoxidized vegetable oil is selected from the group consisting of epoxidized soybean oil, epoxidized linseed oil, and epoxidized castor oil.

15. The method of claim 1 wherein the polymer is fed into the continuous processor at a level which is within the range of about 5 weight percent to about 45 weight percent, based upon the total weight of the asphalt formulation.

16. The method of claim 4 wherein the block copolymer is a linear block copolymer.

17. The method of claim 1 wherein the block copolymer polymer is styrene/ethylene-butylene/styrene block copolymer.

* * * * *